FIG. 1.

INVENTORS
JOSEPH SHILL
WILLIAM C. KERKER
BY
ATTORNEY

March 29, 1955    J. SHILL ET AL    2,704,918
PACKAGING APPARATUS

Filed Sept. 14, 1953    12 Sheets-Sheet 3

INVENTORS
JOSEPH SHILL
WILLIAM C. KERKER
BY
ATTORNEY

March 29, 1955   J. SHILL ET AL   2,704,918
PACKAGING APPARATUS
Filed Sept. 14, 1953   12 Sheets-Sheet 4

INVENTORS
JOSEPH SHILL
WILLIAM C. KERKER
BY
ATTORNEY

March 29, 1955 J. SHILL ET AL 2,704,918
PACKAGING APPARATUS
Filed Sept. 14, 1953 12 Sheets-Sheet 5

INVENTORS
JOSEPH SHILL
WILLIAM C. KERKER
BY
ATTORNEY

INVENTORS
JOSEPH SHILL
WILLIAM C. KERKER
ATTORNEY

March 29, 1955  J. SHILL ET AL  2,704,918
PACKAGING APPARATUS
Filed Sept. 14, 1953  12 Sheets-Sheet 8

FIG. 17.

INVENTORS
JOSEPH SHILL
WILLIAM C. KERKER
BY 
ATTORNEY

March 29, 1955  J. SHILL ET AL  2,704,918
PACKAGING APPARATUS

Filed Sept. 14, 1953  12 Sheets-Sheet 9

INVENTORS
JOSEPH SHILL
WILLIAM C. KERKER
BY
ATTORNEY

March 29, 1955  J. SHILL ET AL  2,704,918

PACKAGING APPARATUS

Filed Sept. 14, 1953

INVENTORS
JOSEPH SHILL
WILLIAM C. KERKER
BY
ATTORNEY

March 29, 1955  J. SHILL ET AL  2,704,918
PACKAGING APPARATUS

Filed Sept. 14, 1953  12 Sheets-Sheet 12

INVENTORS
JOSEPH SHILL
WILLIAM C. KERKER
BY
ATTORNEY

United States Patent Office 2,704,918
Patented Mar. 29, 1955

2,704,918

PACKAGING APPARATUS

Joseph Shill, East Elmhurst, and William C. Kerker, New York, N. Y., assignors to Varick Industries, Inc., New York, N. Y., a corporation of New York Application September 14, 1953, Serial No. 379,994

14 Claims. (Cl. 53—7)

This invention relates to packaging machines, more particularly to an apparatus for the packaging of units, such as bottles, into a box with separating partitions between said units or groups of said units.

In the merchandising of many articles, it is a common practice to provide the interior of a carton with separating walls for housing several items, or groups of a single item. For example, a carton may contain several separators to partition the interior of the carton into a number of sections, each of the sections containing several units of the same article. Bottles of cosmetics or pharmaceutical products are frequently packaged in this manner. It is also a common expedient to package, within a single carton, several complementary items, such as the component parts of a kit, or a bottle and an applicator. In all these packaging methods, the packed units are held in proper position and maintained against displacement during shipment by said separating partitions, the operation of inserting these partitions being done manually, although many of the other operations, such as conveying and inserting, being performed mechanically. This hand method of inserting partitions obviously reduces the speed of packaging, requires the use of considerable labor, and interferes with the desired continuous and uninterrupted packaging operation.

It is primarily within the contemplation of this invention to provide an apparatus that will automatically insert partition walls or separators within a carton during a packaging process. It is also an object of this invention, in connection with the above-mentioned object, to provide automatic means for forming said separators from flat or rolled stock, and feeding such formed portions into the line of travel of conveyed units that are to be packaged, whereby such units are properly positioned upon said separators for subsequent movement into suitably positioned cartons.

It is further within the contemplation of this invention to provide means for forming and inserting one or more separating partitions within a carton so as to provide two or more sections therein. And in this aspect of our invention, it is a further object to convey parallel series of the units that are to be packaged into such relation with successively formed partition members, as to enable said series to be operatively moved into waiting cartons, whereby a package is formed containing therein both the said separators and parallel groupings of said units.

Other objects of this invention are to provide means to simultaneously feed, towards a single discharge point, a continuous row of units to be packaged, a succession of suitably formed partition members and suitably formed and positioned cartons, and combining said units, separators and cartons into a closed and sealed package.

Other objects, features and advantages will appear from the drawings and the description hereinafter given.

Referring to the drawings.

Figure 1:
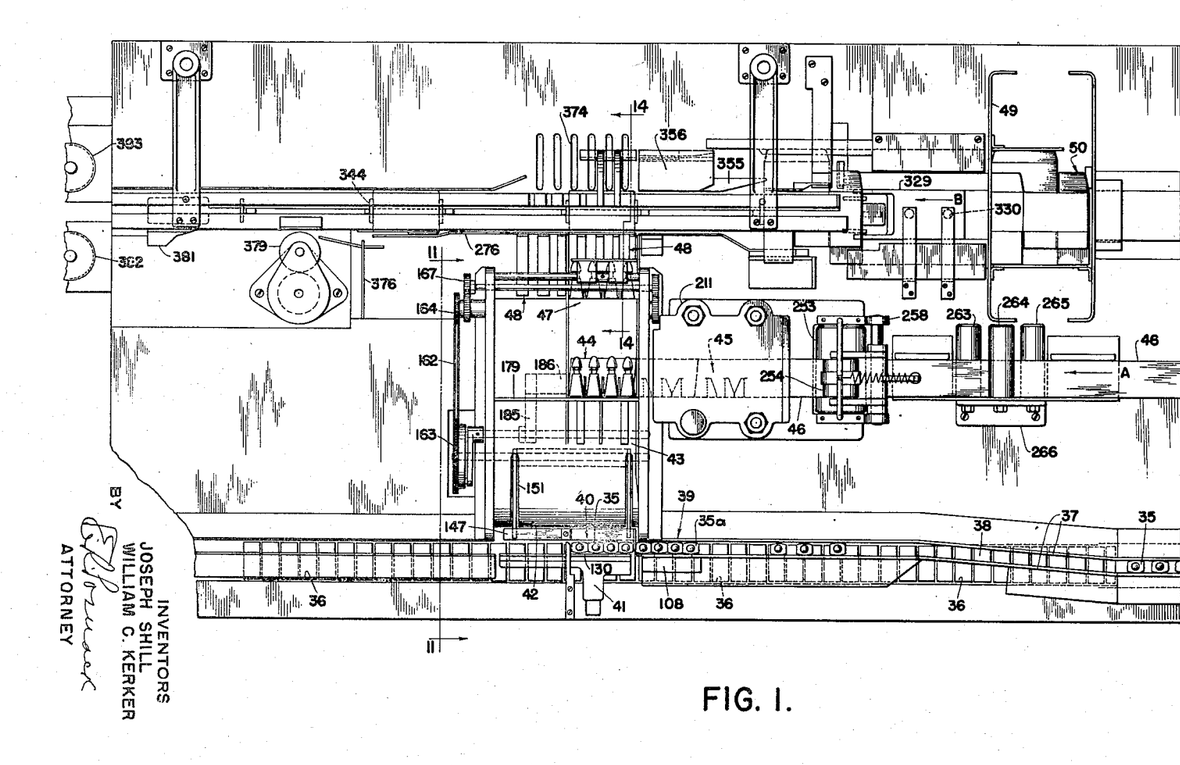
Figure 1 is a general plan view of the apparatus of this invention showing the major components thereof and the position relative thereto of groups of bottles being packaged, this view indicating the paths of travels of bottles, partitions and boxes—from loading and feeding stations on the right side of the figure—the discharge conveyor and other portions of the apparatus being omitted for clarity.

The general movement of the lines of feed can be seen from Figure 1. Bottles 35 are placed upon the rear or loading end of conveyor 36, between guides 37 defining the path 38. The said conveyor belt 36 constitutes a continuous feed, bringing the bottles past region 39 where are located certain switch buttons electrically connected to a clutch for the driving mechanism, as will more clearly hereinafter appear. When the four bottles 35a are all in engagement with said switch buttons at region 39, an electrical circuit is closed and all the conveying and operating apparatus are in operation; but when one of the four switch buttons is not engaged by a bottle, as would occur when there is an interruption in the line of conveyed bottles, all the apparatus other than conveyor belt 36 is automatically discontinued, permitting the belt 36 to bring any delayed bottles into a position at region 39 adjacent the preceding bottles, so that all four bottles will engage the said switch buttons, thereby to restart the stopped mechanism. The operaion of this mechanism will be hereinafter described.

The conveyor belt 36 carries the bottles 35 to the position of region 40, in front of pusher member 41. This member is part of the transfer mechanism for transferring units 35 from the conveyor 36 to a partition loading station and thence toward a carton discharge on which is disposed, at a carton loading station, a waiting open carton, all as will be hereinafter described.

Figures 2, 2A:
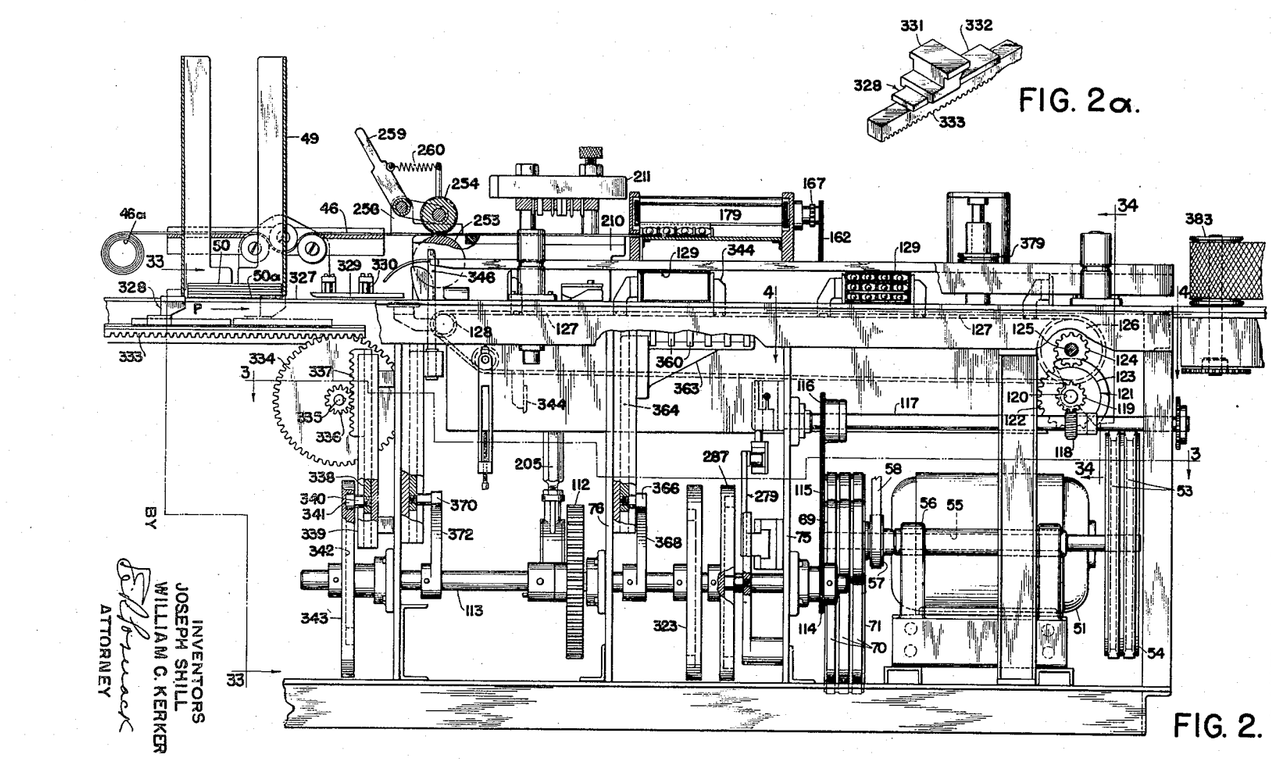
Figure 2 is an elevation of the apparatus of Figure 1 and certain drive and actuating members, the view being taken from a position in front of the machine, the loading and feeding stations being on the left side of the figure—portions being removed and sectioned for clarity.
Figure 2a is a fragmentary perspective of the carton pusher at the feed end of the machine.

Said pusher member is actuated forwardly, as will hereinafter appear, to push the four bottles at region 40 against the curved support 42. At this point the bottoms of said four bottles are engaged by an elevating device and carried upwardly and forwardly along the curved surface of said wall 42 to reach the upper portion thereof, shown at region 43. From here the bottles are pushed forwardly until they overlie and rest upon a separator partition 44 at the partition loading station, said partition having previously been brought into said station by certain feed mechanisms to be hereinafter described, said separator member 44 having been formed from die members in region 45, from a sheet of flat separator stock 46 fed in direction A from a roll 46a (Fig. 2).

The said bottles together with the underlying partition member 44 are then carried forwardly to region 47 and the lowering platform 48 at the carton loading station. The said platform is lowered, in stages, as new groups of bottles with their respective separating partition members are moved to and positioned upon said platform. The arrangement is such that one, two, three or more partition members with groups of bottles thereover are successively moved forwardly, and then stacked one above the other on the said lowering platform. The stacked bottles are then pushed into boxes that have been moved in the direction of arrow B to the loading station in front of platform 48. The boxes are then moved in the same general direction (towards the left in Figure 1) towards a sealing and discharge point.

The mechanism further includes means for feeding flat collapsed boxes from a hopper 49, opening the boxes, closing the top lids thereof, keeping the bottom flaps open, inserting the stacked sets of bottles and separators, closing and sealing the flaps. All of these operations will be hereinafter referred to.

It should be noted that the drive for the conveyor 36 carrying the bottles 35 is continuous, whereas the feed for the flat stock 46 from which separator partitions are formed, and the feed for the collapsed boxes 50 from hopper 49, are intermittent.

Figures 3, 4, 5:
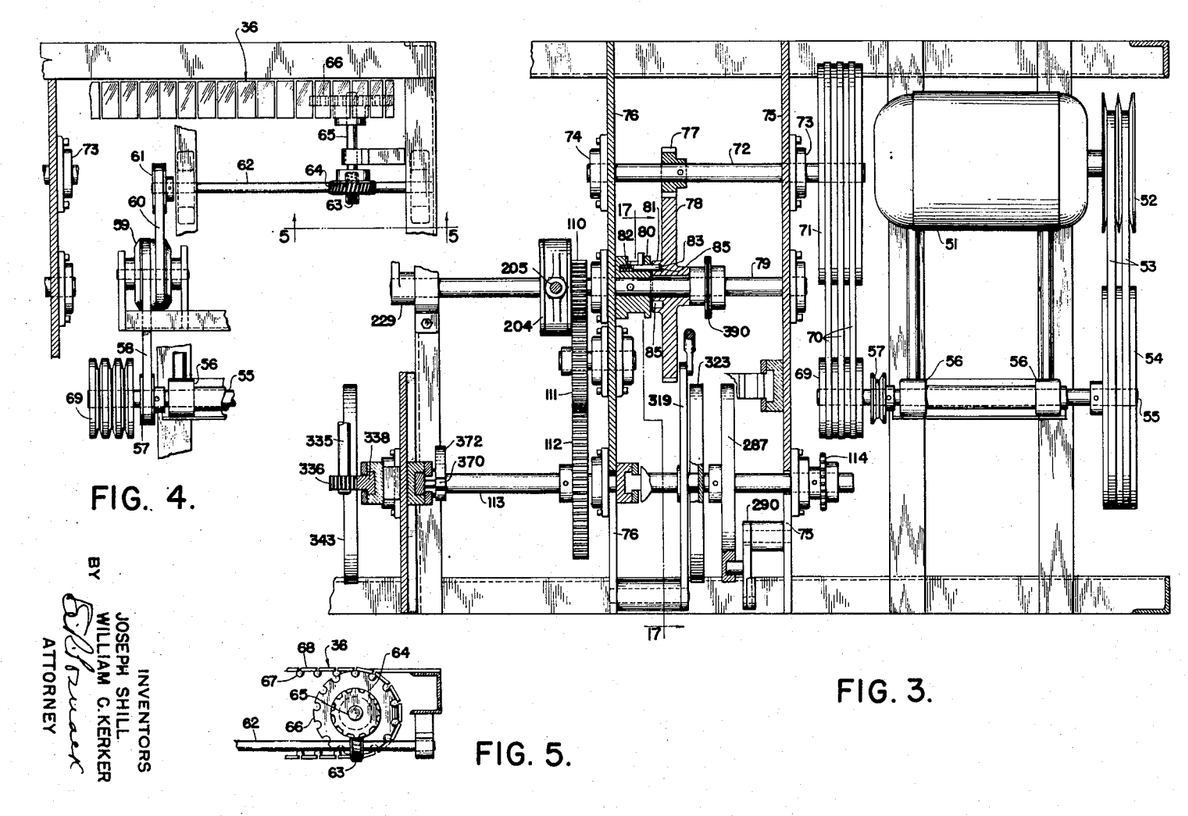
Figure 3 is a fragmentary plan view of the apparatus of Figure 2 taken substantially along line 3—3 thereof, this view showing various shafts and drive mechanisms.
Figure 4 is a fragmentary plan view of the machine taken substantially along line 4—4 of Figure 2, the table top being removed for clarity—this view showing the bottle conveyor driving mechanism.
Figure 5 is a fragmentary elevation of Figure 4 looking from the direction indicated by arrows 5—5.

The drives and actuating means for the various mechanisms employed are illustrated in Figures 2 and 3, as well as in certain other figures which will be referred to. The motor 51 is directly connected to pulley 52 carrying the belts 53 which drive pulley 54 mounted on main drive shaft 55 operatively supported by bearings 56. Fixedly secured to shaft 55 is the pulley 57 connected by belt 58 (Figures 2 and 4) to pulley 59, the latter operatively carrying belt 60 which is connected to pulley 61 fixedly secured to the feed-line conveyor drive shaft 62. Mounted on shaft 62 (see Figure 5) is the gear 63 which engages the gear 64 mounted on shaft 65 upon which is fixedly secured the notched wheel 66, the latter being designed to engage the lugs 67 on the elements 68 of the aforesaid conveyor belt 36. It is hence apparent that as long as said motor 51 is in operation, the said feed-line conveyor belt 36 (for the units to be packaged) is in continuous and uninterrupted operation.

Fixedly mounted on the said main drive shaft 55 is the pulley 69 connected by belts 70 to pulley 71 mounted on the continuously operating auxiliary shaft 72, said latter shaft being supported by bearings 73 and 74 suitably supported by walls 75 and 76, respectively. Affixed to shaft 72 is the pinion 77 in operative engagement with the main clutch gear 78 loosely mounted on the main intermittent shaft 79. Fixedly mounted on said shaft 79 is the clutch member 80 adjacent the hub 81 of gear 78 and normally operatively connected thereto, whereby the operative rotation of said gear 78 will cause the clutch member 80 to rotate and thereby cause a corresponding rotation of said shaft 79 to actuate certain mechanisms to be hereinafter described. Means are provided to effect a disconnection of clutch 80 from gear 78, whereby said gear 78 will idly rotate over shaft 79 which will now be stationary, so that all mechanism actuated thereby will also be inoperative. Such means will now be described.

Figure 22:
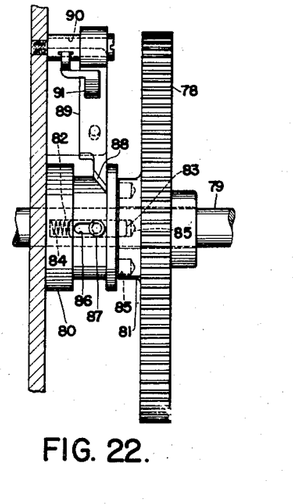
Figure 22 is an enlarged top view of the clutch member for driving portions of the apparatus.
Figure 23:
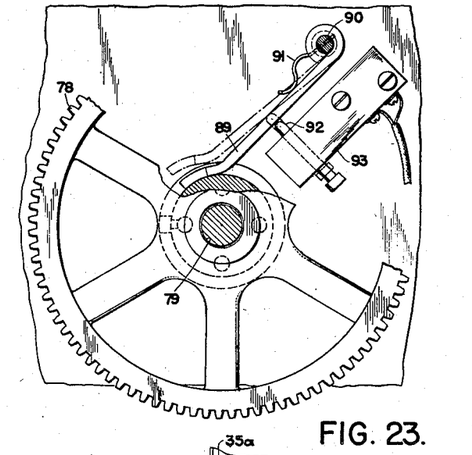
Figure 23 is an end view, with parts broken away and sectioned, of Figure 22, the dot-dash lines showing the elevated operative position of the clutch cam.

The said clutch member 80 contains therein a recessed portion 82 (see Figures 3 and 22) within which is slidably disposed the rod 83, said rod being disposed parallel to shaft 79 and urged by spring 84 into the adjacent recess 85 in the said hub 81 of gear 78. There are a number of said recesses 85 with openings facing the said clutch 80, so that the rod 83 can be operatively projected into any one of said recesses. Connected to said rod 83 and extending outwardly through elongated slot 86 of clutch 80 is the pin 87. The said pin 87 is directly in the path of the inclined cam surface 88 of the pivotally mounted cam lever 89, said lever being pivotally mounted on shaft 90 and yieldably urged downwardly by spring 91 towards clutch 80, for engagement with said pin 87 to retract it along slot 86 against the action of spring 84. When said pin 87 is operatively retracted to the extreme left position of slot 86 (Figure 22), the clutch rod 83 will be out of engagement with the aperture 85 of the hub 81 of gear 78, whereupon the clutch 80 and gear 78 are operatively disconnected. Normally, the said cam lever 89 is urged into its retracted position (shown by dot-dash lines in Figure 23) by the finger 92 of the two-position switch box 93, said finger being in its projected position (also shown by dot-dash lines in Figure 23) when there is no space between the four bottles in region 39 (Figure 1), as will more clearly hereinafter appear. This indicates proper normal operating conditions, since all of said four bottles are in contact with the above-referred-to switch buttons in region 39 to close an electric circuit to said switch box 93, the closing of said circuit maintaining finger 92 in its said projected position. As will appear from the description hereinafter given, when one or more of the bottles in region 39 are not contacting the corresponding switch buttons, the circuit is broken through the switch box 93 to cause a retraction of finger 92 to the full line position indicated in Figure 23, whereby the cam lever 89 is permitted to move to its clutch disengaging position. The details of the switch device 93 are not illustrated, since it is a common two-position switch mechanism actuated by electro-mechanical means well known to those skilled in the art, a description of the operating mechanism of said switch not being necessary for an understanding of the present invention.

Figure 24:
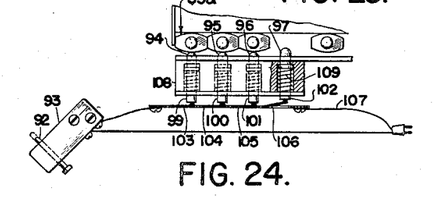
Figure 24 is a diagrammatic view of the electrical control mechanism for actuating the said clutch mechanism.

The said switch buttons and associated elements in the region 39 of the conveyor belt are diagrammatically illustrated in Figure 24, said buttons being identified by the reference numerals 94, 95, 96 and 97. All of these buttons are in the path of the bottles 35a, and are normally engaged by said bottles to cause the corresponding fingers 99, 100, 101 and 102 (extending rearwardly from the buttons) to engage the adjacent switch elements 103, 104, 105 and 106, respectively, and close the circuit through line 107 connected to the said switch mechanism 93. The said fingers 99 to 102 are part of a unit 108 containing springs 109 yieldably urging the said fingers and their buttons towards the said bottles 35a—the switch elements 103 to 106 closing the circuit in line 107 when the said fingers are retracted, and opening the circuit when the fingers are in their operatively forward or projected positions. When one of said buttons, such as 97, is not engaged by a bottle, as illustrated in Figure 24, the spring 109 will cause the button 97 and its finger 102 to be projected forwardly, whereby the switch element 106 will open the circuit in line 107. Since all of the switch elements 103 to 106 are in series, it is apparent that when a single one of said switch elements is in its operatively open position, the circuit in line 107 is broken, causing the finger 92 of the said two-position switch box 93 to be retracted to the clutch disengaging position illustrated. However, when there is no discontinuity in the line of bottles 35a, all of the buttons 94 to 97 will be depressed, to complete the circuit through switch box 93, whereby the finger 92 will be brought to its projected position to urge the clutch cam lever 89 into its retracted position; and when this occurs said spring 85 urges the rod 83 into one of the apertures 85 of the gear 78, whereby the clutch and said gear are operatively connected. Hence, it is only when there is an uninterrupted line of bottles 35a (or other units to be packaged) contacting the buttons 94 to 97 in region 39, that shaft 79 will rotate to actuate certain mechanisms connected thereto. These mechanisms are associated with the separator partition and box feeds, various intermittent conveying, die-cutting, scoring and flap engaging means, to be hereinafter described.

By referring to Figure 3 it will be seen that mounted upon said shaft 79 is the gear 110 in engagement with intermediate gear 111 which engages gear 112 mounted on cam shaft 113. The said last-mentioned shaft has fixedly secured thereto a number of cams, to be hereinafter referred to, which actuate certain of the mechanism of this apparatus. Also mounted on cam shaft 113 is the sprocket wheel 114, the sprocket chain 115 of which (Figure 2) is connected to sprocket wheel 116 secured to shaft 117 carrying the gear 118 in engagement with gear 119 mounted on shaft 120. And mounted on shaft 120 is the gear wheel 121 which contains on a portion of the periphery thereof the gear teeth 122, the remaining portion 123 of the periphery being relatively smooth. In operative engagement with gear wheel 121 is the gear 124 mounted on shaft 125, the arrangement being such that only when the teeth 122 are in engagement with the teeth on gear 124 will shaft 125 rotate. Mounted on shaft 125 is the sprocket wheel 126 in engagement with the carton conveying belt 127, the sprocket wheel 126 coacting with the opposite sprocket wheel 128 to drive said belt 127. It is thus apparent that belt 127 is intermittently operated, the arrangement being such, as will hereinafter appear, that the belt will be stationary when an open carton, such as 129, is in a position to receive a stack of bottles and partition members, as illustrated in Figure 17, the belt 127 continuing its movement after the bottles and partition members have been inserted.

Figure 10:
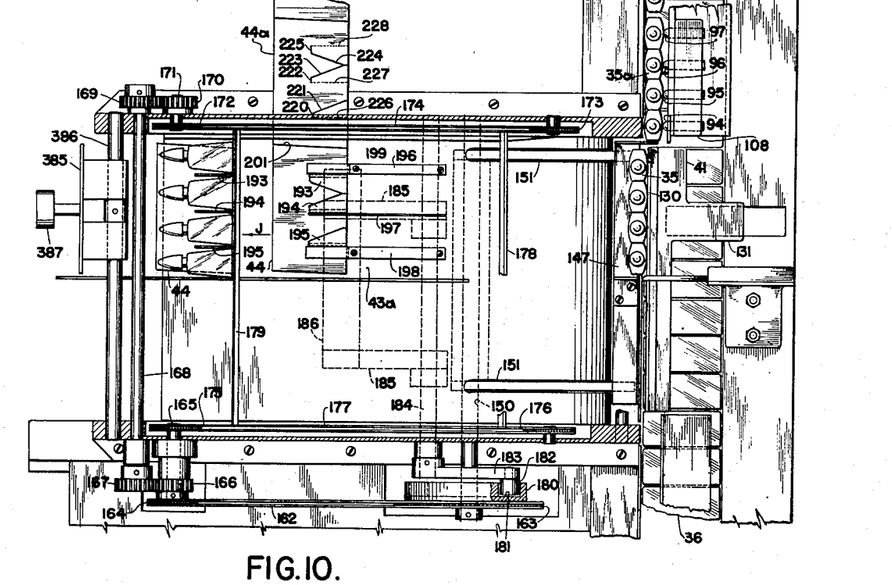
Figure 10 is a plan view of a portion of Figure 1 showing the bottle feed and transfer mechanism, the section being taken substantially along line 10—10 of Figure 11.
Figure 11:
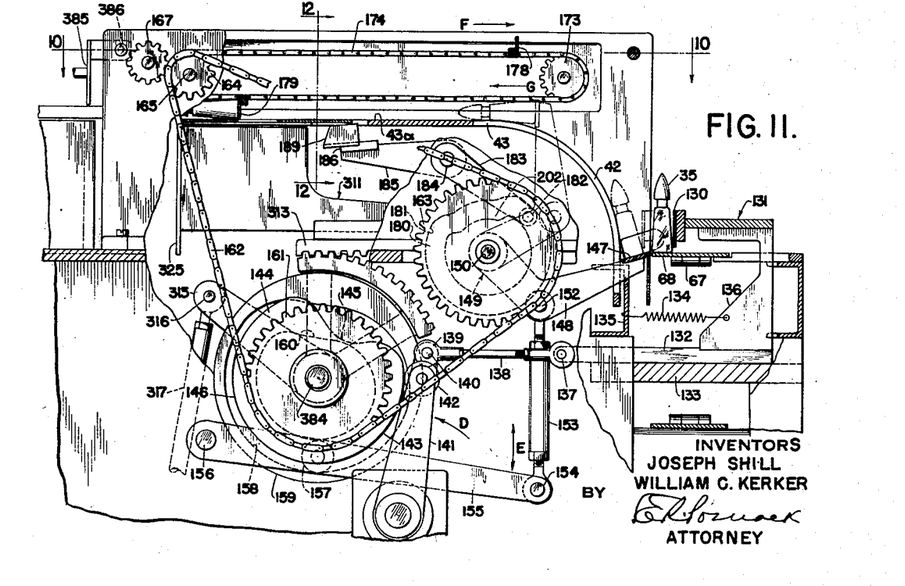
Figure 11 is a fragmentary elevational and part sectional view of Figure 10, the section being taken substantially along line 11—11 of Figure 1.

By referring to Figures 10 and 11 in conjunction with Figure 1, it will be seen that a row of bottles 35 are in position in front of the plate 130 of the rear pusher 131. As illustrated, only four bottles are in position to be moved transversely across the apparatus, although the transverse path is sufficiently wide to accommodate several more units; and the particular mechanism illustrated is for packaging three parallel rows of four bottles. The said rear pusher member 131 contains a base 132 which is slidably mounted on the support 133 and is yieldably urged forwardly by spring 134, the latter being attached to the angle iron 135 and the frame 136 of the pusher. The forward portion of said base 132 is pivotally connected at 137 to the adjustable link 138, the front 139 of the link being pivotally connected at 140 to the follower arm 141 which carries the roller 142, said roller being in engagement with the outer cam surface 143 of the plate cam 144 mounted on shaft 384. The said roller 142 is maintained in pressing engagement with cam surface 143 by the action of said spring 134. The said cam surface contains the depressed portion 145 and the outer arcuate portion 146, the said depressed portion 145 occupying a relatively small portion of the cam periphery.

Figure 17:
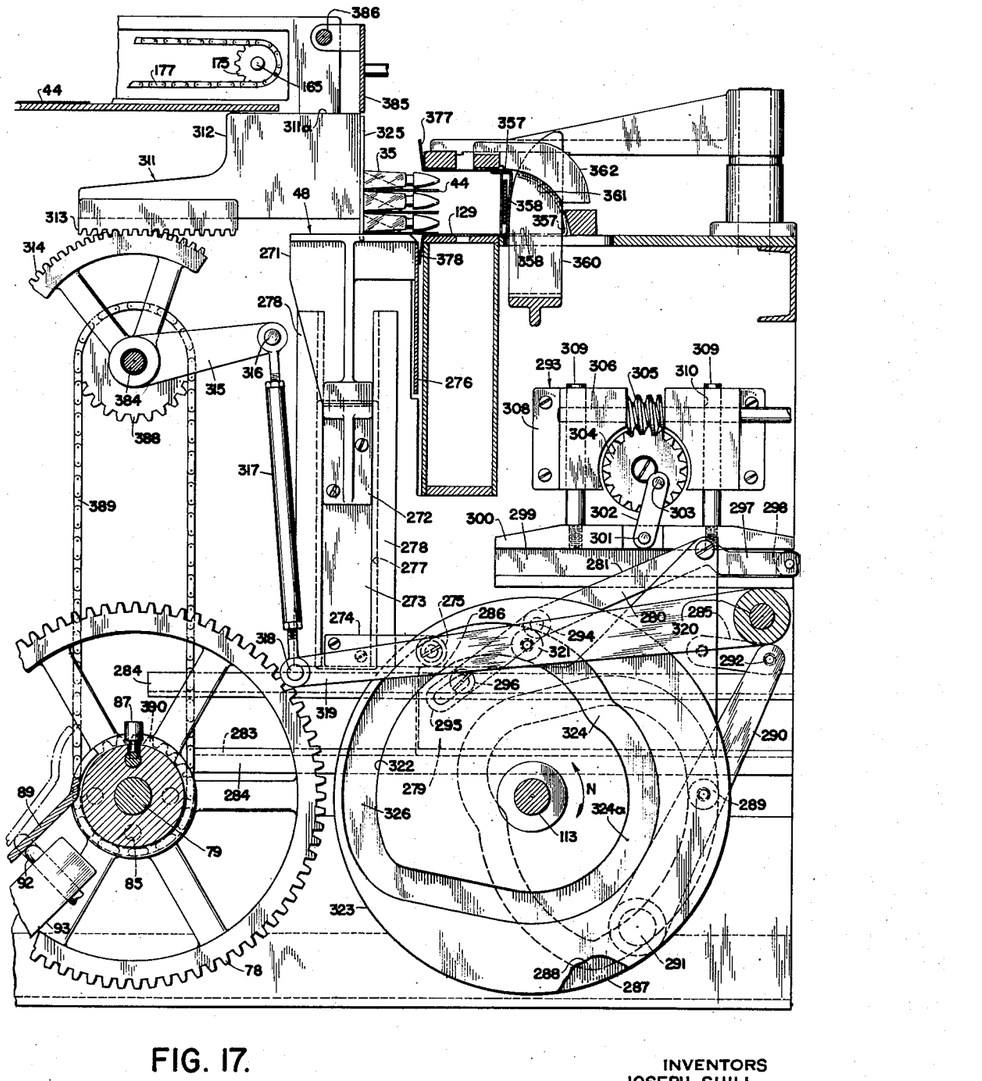
Figure 17 is an enlarged section, taken substantially along line 17—17 of Figure 3, showing the parts illustrated in Figure 14 and also including the drive mechanism for the pusher—the lowering device being shown at its lowermost position, and the pusher being shown starting forwardly.

By referring to Fig. 17 it will be seen that mounted on shaft 384 is sprocket wheel 388 driven by chain 389, same being actuated by sprocket wheel 390 secured to shaft 79.

During the operative rotation of the cam 144, the arm 141 will move in the direction of arrow D when the roller 142 engages said recessed portion 145 of the cam surface 143 (Figure 11), thereby carrying link 138 and the entire pusher 131 forwardly, whereby the said pusher plate 130 engages the row of bottles 35, to transfer said row upon the longitudinal bottle rest 147 supported by arms 148 of the bellcrank 149 pivotally mounted on shaft 150. Before proceeding to examine the operation of said bellcrank 149, it should be noted that when the said roller 142 leaves the said depressed portion 145 of cam 144 and engages the arcuate portion 146 thereof, the follower arm 141 will be moved to the right, to retract the pusher 131 into its original non-engaging position illustrated in Figure 11.

The said arms 148 of bellcrank 149 extend through transverse lateral slots 151 in the wall of said curved support 42, said slots extending upwardly from a point below the pusher plate 130 to the upper horizontal flat portion of the said curved support 42 in region 43. The said arms are operatively movable upwardly and forwardly along said slots, in a manner to be described, whereby said rest bar 147 carries the bottles supported thereby (shown dot-dash in Figure 11), upwardly and forwardly along the curved surface of said member 42 until the bottles reach the upper portion in the aforesaid region 43. Thereafter the said arms 148 are retracted, the bottles being carried forwardly by another member to be later described.

Pivotally connected at 152 to the bellcrank 149 is the adjustable turnbuckle arm 153, the lower terminal 154 of which is pivotally connected to the arm 155 which in turn is pivotally connected to the framework of the machine at 156. The said arm 155 carries the roller 157 which is disposed and operatively engageable with the groove 158 of cam 159 mounted on shaft 384. The said cam groove 158 contains the depressed portion 160, the rest of the groove being substantially arcuate. Upon the operative rotation of cam 159, the arm 155 will be operatively moved up and down in the direction of arrows E (Figure 11) to cause corresponding up and down movements of the bellcranks 149 and the associated arms 148. It is upon the upward or counterclockwise rotation of arms 148 about axis 150 that the bottles are moved upwardly and forwardly in the manner above-described, the arms being retracted to their original lowered position when the arm 155 is in its bottom position.

Operatively mounted on shaft 384 is the sprocket wheel 161 in engagement with sprocket chain 162, said chain being also in engagement with sprocket wheel 163, mounted on shaft 150 and sprocket wheel 164 mounted on shaft 165. Carried by said shaft 165 is the gear 166 which is in engagement with gear 167 fixedly mounted on shaft 168 extending longitudinally of the machine. The opposite end of shaft 168 carries the gear 169 which is in engagement with gear 170 mounted on shaft 171 supporting the sprocket wheel 172 which, coacting with sprocket wheel 173, operatively carries the sprocket chain 174. Oppositely positioned are sprocket wheels 175 and 176, said sprocket wheels operatively carrying the sprocket chain 177. The said sprocket chains 174 and 177 carry, in the form illustrated, two longitudinally disposed push bars 178 and 179. These are positioned and proportioned to engage the rear bases of the bottles to move them forwardly from their positions at region 43 to which they have been brought by the said arms 148 (see Figure 11). As a pusher bar, such as bar 178 shown in Figure 11, continues in the rearward direction of arrow F, it will pass around the associated said sprocket wheels and then move forwardly in the direction of arrow G to engage the bases of the bottles at region 43 and move them forwardly over the separator partition member 44 (which had previously been conveyed to floor 43a). The continued rearward movement of the pusher bar 178 will now move both the partition member 44 and the bottles supported thereby forwardly until they are deposited upon the lowering platform 48, as above stated, whereafter the pusher bar 178 continues around the sprockets 165 and 172 to follow its upper course; and while this is occurring, the other pusher bar 178 is performing the function above-described with reference to bar 178.

Figures 12, 13:
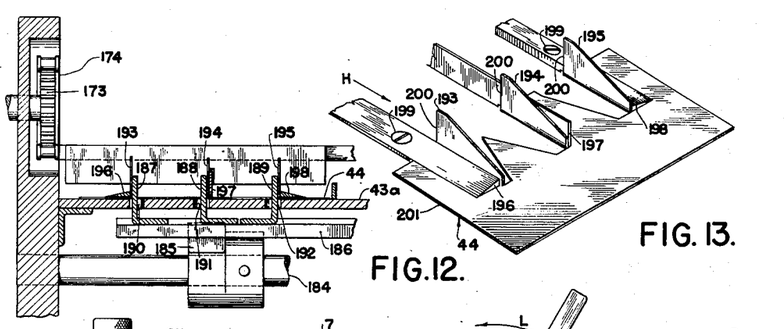
Figure 12 is an enlarged section of Figure 11 taken substantially along line 12—12 thereof, showing the bending mechanism for forming the flaps on the separator partitions.
Figure 13 is a perspective view of a separator partition, after the flaps have been operatively bent upwardly, the stationary die members of the flap bending mechanism being shown in place.

Also mounted on shaft 150 is the cam 180 which contains the groove 181 within which is rotatably disposed the roller 182 at the end of follower arm 183, said arm being secured to shaft 184 upon which are mounted the levers 185 carrying the mechanism for forming flaps in the separator member 44 while it is in its position on said floor 43a (see Figures 10, 11 and 12). As illustrated in these figures, a bar 186 is carried by said levers 185; and extending upwardly from said bar are the ears 187, 188 and 189 extending through apertures 190, 191 and 192 in floor 43a. Said ears are so proportioned and positioned that when the bar 186 is operatively moved upwardly, the ears will respectively engage flaps 193, 194 and 195 of the separator member 44, the outlines of said flaps having been formed by previously operated die mechanism, to be hereinafter described. Hence, when bar 186 is in its uppermost position illustrated in Figure 12, the said flaps 193, 194 and 195 are in an upright position and in engagement with the respective stationary die members 196, 197 and 198 secured to floor 43a by screws 199. The arrangement is hence such that during the above-described movement of bottles 35 on floor 43a, they are moved over and upon the separator partition 44, the bottles being separated by the said flaps 193, 194 and 195. As illustrated in Figure 1, four bottles are arranged in alignment without contacting each other.

It is to be noted that the outer stationary die members 196 and 198 are substantially flat, and permit the outer bottles to ride thereover during their operative movement in the direction of arrow H (Figure 13), the center stationary die member 197 being upright so as to occupy a minimum of space between flaps 194 and 195. The arrangement is hence such that when a forwardly moving pusher bar, such as 178, reaches the separator 44, it will not only engage the rear of the bottles 35, but also the rear edges 200 of said flaps, to push both the separator partition 44 and the bottles thereon forwardly.

By referring to Figure 10 it will be seen that the lateral edge 201 of the separator 44 is slightly biased, said edge being cut obliquely forwardly and to the right, so as to permit an immediate separation of separator member 44 from its adjacent following separator partition member 44a, as separator 44 is operatively moved forwardly in the direction of arrow J.

When the said roller 182 is positioned in the depressed portion 202 of cam groove 181, the said bar 186 is in its raised position; whereas when said roller 182 is in engagement with the other portion of the cam surface, the bar 186 will be moved downwardly, and the flap-forming ears 187, 188 and 189 will be retracted to a position below floor 43a.

Figure 6:
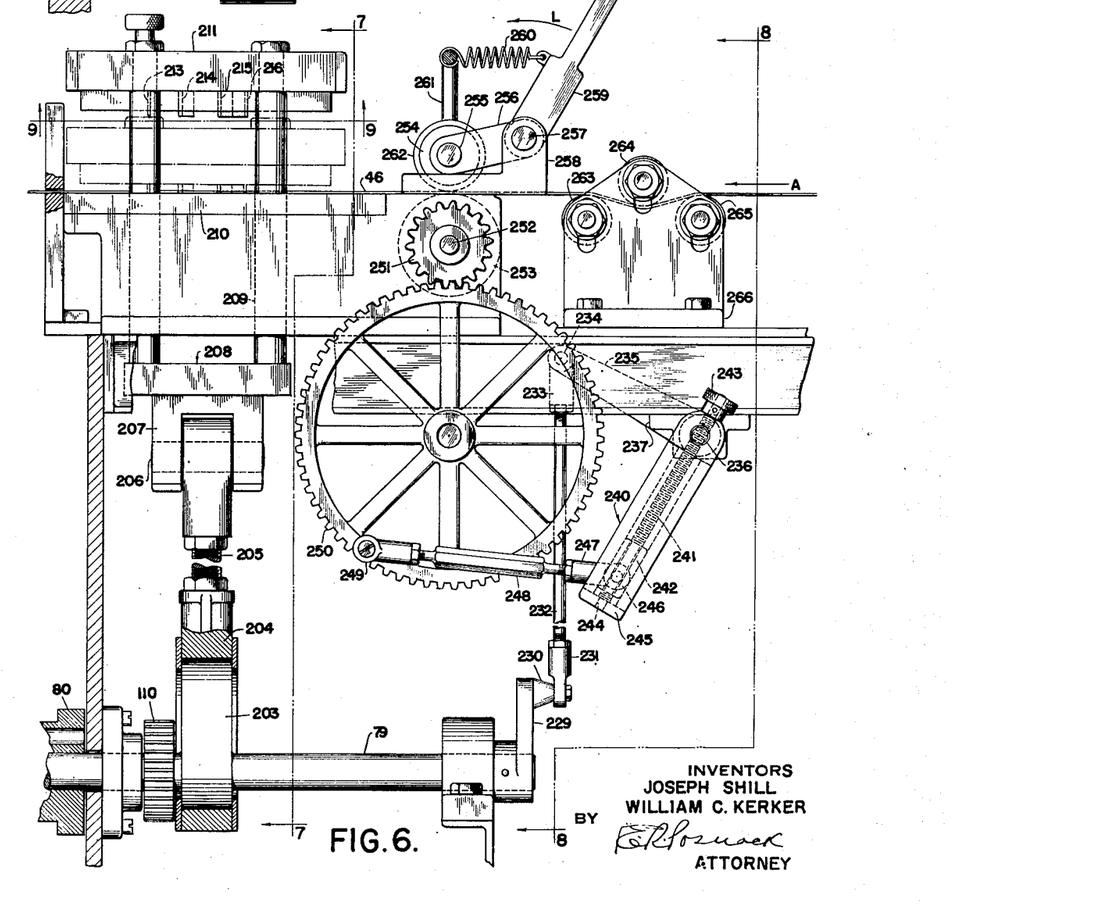
Figure 6 is a front elevational view showing the paper feed for the separator partitions and the control for the die cutting mechanism.
Figures 7, 8:
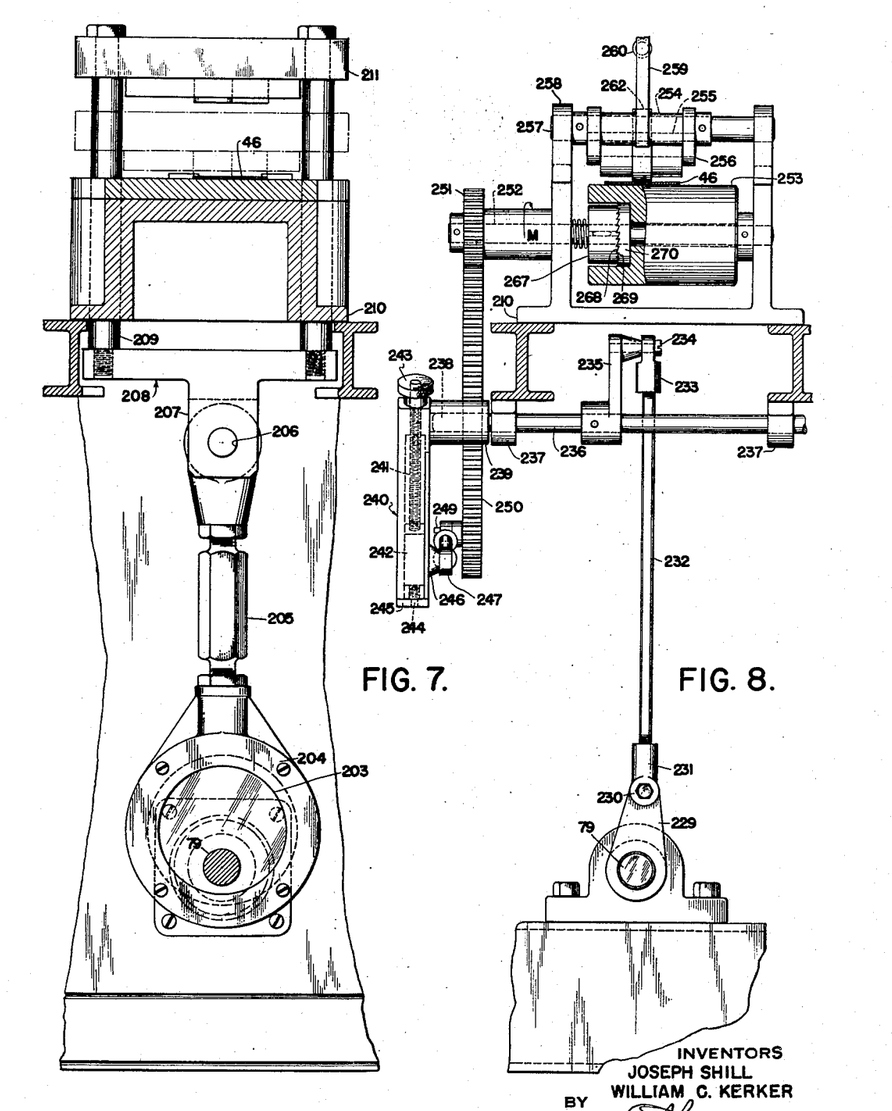
Figure 7 is a fragmentary section of Figure 6 taken substantially along line 7—7 thereof, showing the crank apparatus for operating the die cutting mechanism.
Figure 8 is a section of Figure 6 taken substantially along line 8—8, showing the roller feed mechanism for the separator partitions.
Figure 9:
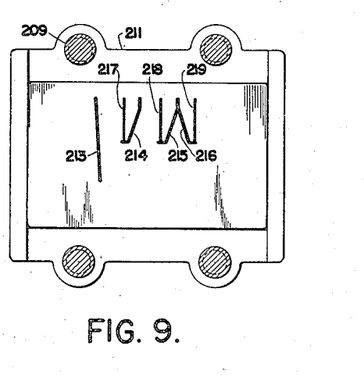
Figure 9 is a bottom view of the steel rule scoring and piercing punch, looking in the direction indicated by arrows 9—9 of Figure 6.

The die mechanism for scoring and cutting the partition sheet is operated by shaft 79, such mechanism comprising an eccentric 203, a sheave 204 mounted over said eccentric, and a turnbuckle 205 extending upwardly therefrom, the upper portion of the turnbuckle being pivotally mounted upon the pin 206 supported by the perforated bifurcated ears 207 of the ram member 208 supporting the posts 209 which extend through bedplate 210 and which carry the tool support or punch 211. The punch elements, which are illustrated as steel rule dies, are adapted to score and perforate the sheet stock 46 from which the separator partitions are formed (see Figures 6, 7 and 9). Die 213 is a parting blade which cuts a separator partition, such as 44a, from the rest of the sheet stock 46. The other perforating blades are represented by reference numerals 214, 215 and 216, the scoring blades being 217, 218 and 219. When the punch member 211 is operatively moved downwardly from the upper full line positions to the dot-dash positions shown in Figures 6 and 7, the said die elements come into engagement with the underlying sheet, and create through cuts and scored outlines, as shown in Figure 10, the cut edges being 220, 221, 222, 223, 224 and 225, and the scored outlines beig 226, 227 and 228. When said separator partition member is operatively engaged by the aforementioned flap forming means, the appearance of the partition member is like that shown in Figure 13.

The drive for the separator partition stock 46 is also taken off the shaft 79. Fixedly mounted on said shaft is the arm 229 (Figures 6 and 8) the upper terminal of which has a lug 230 which is pivotally attached to the fitting 231 forming part of a turnbuckle link 232, the upper fitting 233 of which is pivotally connected to lug 234 at the end of arm 235, the latter being secured to shaft 236 supported by bearings 237. Fixedly mounted at the terminal 238 of said shaft is the hub 239 of the adjustable rocker member 240. Said member has a threaded carriage bolt 241 therein upon which is mounted the threaded nut 242, said bolt being attached at its upper terminal to an adjusting knob 243, the lower terminal 244 of the bolt being rotatably set within the base 245 of said rocker member 240.

Pivotally mounted on the extension 246 of said nut 242 is the fitting 247 of the turnbuckle link 248, the terminal 249 of which is pivotally attached to the peripheral portion of the gear 250. Said gear is in engagement with another gear 251 which is affixed to shaft 252 on which is loosely mounted the bottom roller 253. Disposed above roller 253 is the upper roller 254 rotatably mounted on shaft 255 to which are secured the opposite arms 256, said arms being secured to shaft 257 which is rotatably supported by the bearing 258. Associated with arms 256 is the arm 259 to which is attached the spring 260 anchored on the machine structure at 261. The said spring 260 normally urges the arm 259 in the direction of arrow L, whereupon the upper roller 254 is urged downwardly towards the lower roller 253. In the preferred construction, the upper roller 254 contains an enlarged medial portion 262 which is adapted to engage the partition stock 46 which is fed in the direction A between the three rollers 263, 264 and 265, supported in angle bracket 266.

The operative rotation of shaft 79 causes a reciprocating movement of link 232, such movement being transmitted through arm 235 and shaft 236 to the rocker member 240.

Fixedly mounted on shaft 252 is the collar 267 having at the inner end thereof an arrangement of teeth 268 proportioned to engage the correspondingly positioned teeth 269 on the collar 270 affixed to said lower roller 253. Each of the teeth has one sloping surface and another extending substantially in the direction of shaft 252, thereby producing the conventional construction for a one-way drive. The arrangement is such, as is well known to those skilled in the art, that when the collar 267 rotates in the direction of arrow M, the teeth thereon will so engage the teeth on collar 270 as to rotatably actuate the roller 253, whereas when said collar 167 turns in the opposite direction, the teeth 268 thereof slip over the corresponding teeth 269 of collar 270, without any driving effect. Hence, upon the operative rocking movement of said rocker 240, the said collar 267 will intermittently be moved in the direction of arrow M to intermittently drive the lower roller 253 and thereby cause intermittent feeding movements of the partition stock 46. The extent of the feed can be regulated by turning knob 243 of rocker 240, whereupon the nut 242 can be moved upwardly or downwardly along carriage bolt 241, to change the position of the pivotal connection of link 248 with said rocker 240, producing a change in the arcuate movement of gear 250 during each rocking movement of rocker 240.

As above stated, the partitions 44 and bottles superimposed thereon are moved forwardly towards the platform of the lowering device 48, this device being lowered in stages to permit successive stacks of partitions and bottles to be placed thereon. The operating mechanism for said lowering platform is illustrated in Figures 14 to 21. As will be seen from Figure 20, the said lowering device 48 consists of a plurality of parallel bars or grids 271, these being secured to a base 272 attached to a vertical slide 273, the lower terminal of which carries a forwardly extending bar 274 to the terminal of which is secured the roller 275. Also secured to member 48 is the flap-engaging bar 276, which will later be referred to. The said lowering device 48 is movable between an upper position illustrated in Figure 14 to a lowermost position shown in Figure 17. The said slide 273 is slidably movable within the vertical groove 277 of the guide member 278. The entire lowering device 48 is supported by the variable cam device 279 upon which rests the said roller 275 of said slide 273.

Figures 14, 15, 16, 19, 20, 21:
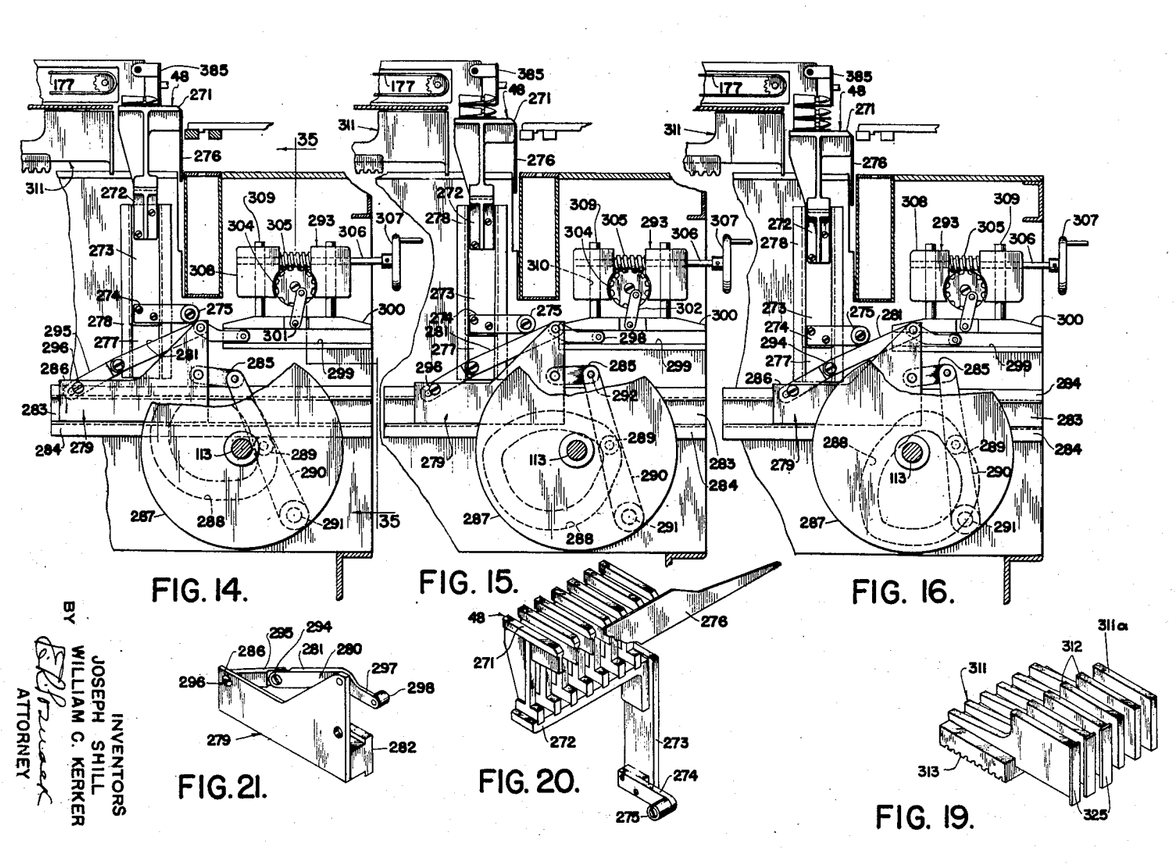
Figure 14 is a fragmentary section of Figure 1 taken substantially along line 14—14, showing the partition lowering platform in its uppermost position, and the pusher for the units being packaged in its retracted position.
Figure 15 is a view substantially like that of Figure 14, but showing the said lowering device operatively lowered one stage below its position of Figure 14, and showing the pusher in its retracted position.
Figure 16 is a view like Figure 14, showing the lowering device in a position two stages below that of Figure 14, and showing the pusher still in its retracted position.
Figure 19 is a perspective view of the said pusher member.
Figure 20 is a perspective view of the said partition lowering device.
Figure 21 is a perspective view of the adjustable slide cam for operatively actuating the lowering device.

The said variable cam member 279 contains an inclined arm 280, the upper edge 281 of which constitutes an inclined cam surface with which the said roller 275 is engageable. Constituting an integral part of cam structure 279 is the slide portion 282 at the base thereof, said slide portion being slidably movable within the groove 283 of a horizontal guide member 284. Said slide portion 282 is operatively movable within the guide 284 by a cam actuating arm 285, the actuating means therefor to be hereinafter described. During such actuation, the inclined cam surface 281 is moved horizontally relatively to the roller 275, whereupon the position of the roller and associated parts are correspondingly varied. For example, Figure 14 shows the roller 275 in its uppermost position at the upper end of cam surface 281, at which position the platform is at its highest position. Figure 15 shows the cam device 279 moved somewhat to the right from its position of Figure 14; and at this point the roller 275 has moved downwardly along the inclined cam surface 281, thereby causing a lowering of the platform 48, the amount of drop being predetermined to equal substantially the height of a partition member and the bottles thereon. As the cam device 279 continues its movement to the right, it reaches the position of Figure 16, where the roller 275 is at a still lower position on inclined cam surface 281, the platform 48 having moved down another stage.

In Figure 17, the variable cam device 279 has moved so far to the right that the roller 275 is no longer disposed on the inclined cam surface 281 but is resting on the upper edge 286 of cam device 279. In this position, the platform 48 is at its lowermost position, supporting a stack of three rows of bottles ready to be pushed into the waiting box 129, in a manner to be hereinafter set forth.

The movement of the said actuating arm 285 (which controls the sliding movement of variable cam device 279) is effected through the cam 287. This contains the cam groove 288 within which is disposed the roller 289 rotatably mounted on arm 290, said arm being pivotally mounted at 291—the opposite terminal of arm 290 being pivotally connected at 292 to said actuating arm 285. The contour of the cam groove 288 is such that, upon the operative rotation of shaft 113 (upon which cam 287 is mounted) the arm 290 is caused to move first in one direction and then in an opposite direction, the extent of movement being determined by the throw of the cam, in known manner. Such movement causes a corresponding movement of arm 285 which slidably actuates the variable cam device 279 between its fully retracted position shown in Figure 14 to its extreme projected position shown in Figure 17.

The angularity of the inclined cam surface 281 can be varied to adapt the position of platform 48, in each of the stages thereof, to the height of the article being packaged. This is accomplished through the medium of the adjusting mechanism 293 which changes the angular position of bar 280, the latter being pivotally attached at 294 to the arm 295 pivotally attached at 296 to the slotted portion in an end of bar 295. The forward portion of bar 280 carries the arm 297, at the forward portion of which is the roller 298. This roller is disposed within the groove 299 of the guide base 300 suspended at pivotal point 301 from the link 302. Said link is pivotally connected at 303 to the gear 304 which is in engagement with the worm 305 mounted on shaft 306 attached to crank handle 307. The said shaft 306 extends through block 308 which is fixedly mounted to the structure of the machine. The said guide base 300 contains two upwardly extending posts 309 slidably extending through apertures 310 in said block 308.

In the operation of this adjusting mechanism, a turning of the crank handle 307 will cause a rotation of worm 305 and a consequent rotation of gear 304, carrying with it the eccentrically mounted link 302. This causes a raising or lowering of said pivotal point 301 of said link and a consequent raising or lowering of the guide base 300 which carries the roller 298 with it. The adjusting movement of base 300 causes said roller 298 to move up or down, and at the same time to slidably move within the groove 299, such movement of the roller 298 causing a corresponding movement of arm 297 to either raise or lower arm 280 and thereby cause a change in the inclination of cam surface 281. The pivotal connections at 294 and 296 make this variation possible. Once the proper angularity of cam surface 281 is obtained, no further adjustments need be made for the particular units being packaged.

Figures 35, 36:
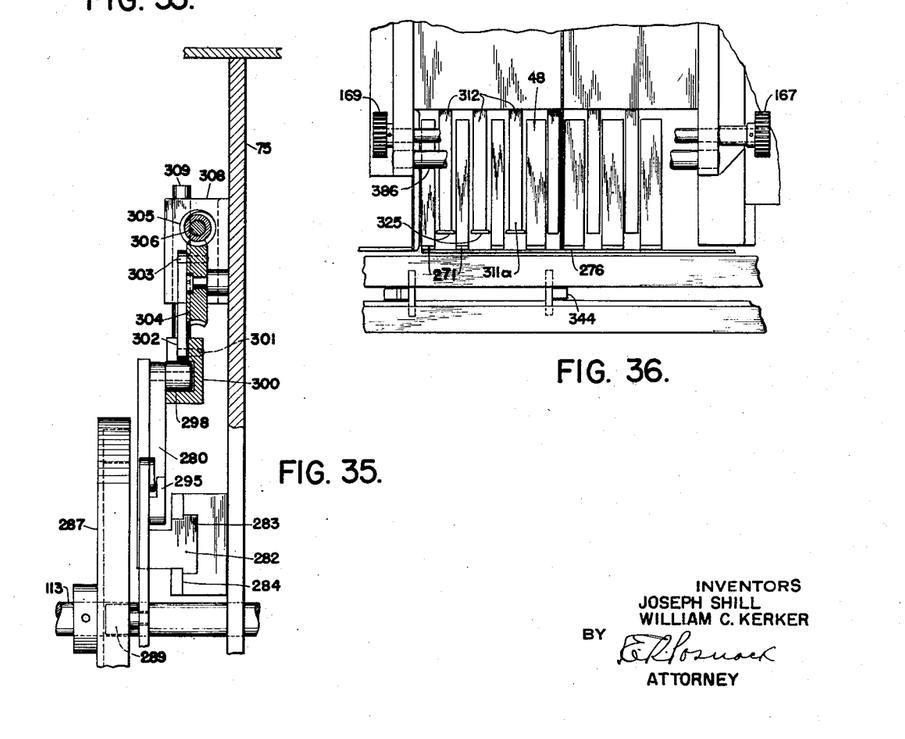
Figure 35 is a fragmentary section of Figure 14 taken along line 35—35.
Figure 36 is a fragmentary plan view of Figure 18 looking in the direction of line 36—36.

The front pusher member 311 for moving the stacked partitions and bottles into the waiting carton is illustrated in Figure 19. This consists of a plurality of spaced bars or grids 312, spaced to correspond with the grids 271 of the lowering device 48, the grids 312 being disposed alternately between grids 271, as illustrated in Figure 36. The rear underside portion of pusher 311 contains a gear rack 313 which is in engagement with the gear segment 314 loosely mounted on shaft 384. Connected to gear segment 314 is the arm 315, the terminal 316 of which is pivotally connected to the adjustable link 317 whose opposite terminal 318 is pivotally connected to the pusher actuating arm 319 pivotally mounted at 320. Rotatably supported by said arm 319 is the roller 321 which is operatively disposed within the groove 322 of cam 323. The maximum depressed portion 324 of said groove 322 is so arranged that when the roller 321 is at such point (the cam turning in the direction of arrow N, Figure 17), the said terminal 318 of arm 319 will be at its lowest point, whereby the link 317 will have actuated the pusher 311 (through gear segment 314) to its foremost position illustrated in Figure 18 by dot-and-dash lines.

Figure 18:
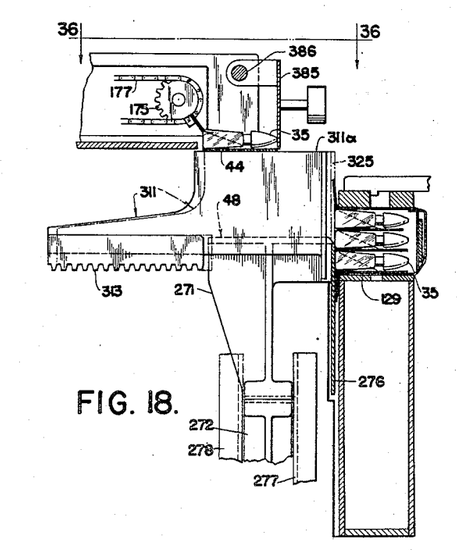
Figure 18 is a view substantially like Figure 14, but showing the lowering device rising upwardly, the pusher being shown dot-dash in the extreme forward position, and in full lines in its forward dwelling position.

The flat pusher bar 325 of the pusher member 311 will, at this point, push the stacked bottles 35 and separator partitions 44 completely into the waiting box 129. As will be observed from the contour of cam groove 322, the dwell at such extreme forward position of the pusher is only momentary, since the cam groove curves towards the periphery of the cam immediately beyond the said innermost point 324. There is thus an immediate retraction of the pusher from its extreme forward position—Fig. 18 showing it in a partially retracted position where it remains (while roller 321 is in contact with arcuate portion 324a)—thereby permitting the upward movement of the lowering device 48 and the bar 276 carried thereby. In this position the upper surface 311a of pusher 311 is disposed to receive a new tier of partition members and superposed bottles, until the platform of the lowering device 48 reaches its uppermost position. As the cam 323 continues its operative movement, the pusher 311 will be retracted to its rearmost position, which position is reached when the roller 275 is in engagement with the arcuate portion 326 of groove 322.

It will be further observed that the relationship between the position of the lowering device 48 and the front pusher member 311 is such that the latter only begins to move forwardly when the lowering device has reached its lowermost point, as indicated in Fig. 17. Since the grids 312 of the pusher are disposed between the grids 271 of said lowering device 48, the pusher can move forwardly while the platform of said lowering device is in its lowest position. Similarly, before the pusher 311 has been fully retracted to the positions shown in Figs. 14, 15 and 16, the lowering device 48 may begin to rise. This condition is illustrated in Fig. 18 in which the pusher member 311 is disposed short of its foremost position and the lowering platform is rising.

The bottles that are operatively conveyed in the manner above-described to the lowering platform 48 are prevented, by plate 385, from being propelled forwardly by the pusher beyond a predetermined position on the platform. The said plate 385 is pivotally suspended from shaft 386 (see Figs. 17 and 18), the plate engaging the front of the bottles and thereby holding them in line. In the form illustrated, the plate is yieldably urged rearwardly by the adjustable weight 387 so that it will not constitute too rigid a barrier.

As aforesaid, the boxes for receiving the inserts are stacked in flat collapsed form in hopper 49 (see Figures 1 and 2). The lowermost of the stack of flat boxes 50 rests on table 327, the carton pusher 328 being operatively movable in the direction of arrow P to engage said lowermost box 50a and push it along the table, underneath the guide plate 329 suspended from the bars 330, towards the conveyor belt 127. The said carton pusher 328 consists of a push plate 331 connected to the slide base 332 supported upon the rack 333, the teeth thereof being in engagement with the teeth of gear 334 mounted on shaft 335. Fixedly secured to said shaft 335 is the pinion 336 in engagement with the vertical rack 337 secured to slide 338 movable vertically within guide 339. Affixed to slide 338 is the pin 340 carrying the roller 341 operatively disposed within the groove 342 of cam 343 secured to shaft 113. As will be seen from the contour of the cam groove 342, the vertical throw thereof is such that the pin 342 and the slide 338 carried thereby will move vertically between upper and lower limiting positions. When the slide 338 is in its uppermost position, the rack 333 is in its rearmost position, and the carton pusher 328 is behind the stack of collapsed cartons 50, as shown in Figure 2.

Figure 25:
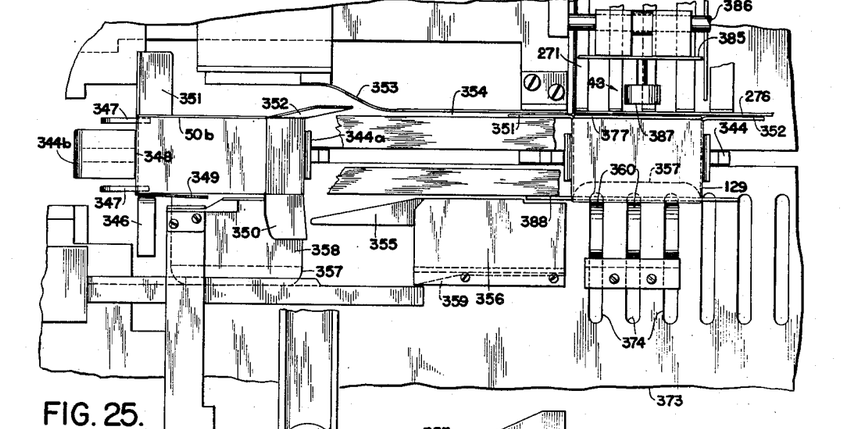
Figure 25 is an enlarged plan view of a portion of the apparatus shown in Figure 1, illustrating the carton opening and lid tucking mechanism.
Figures 26, 27, 28:
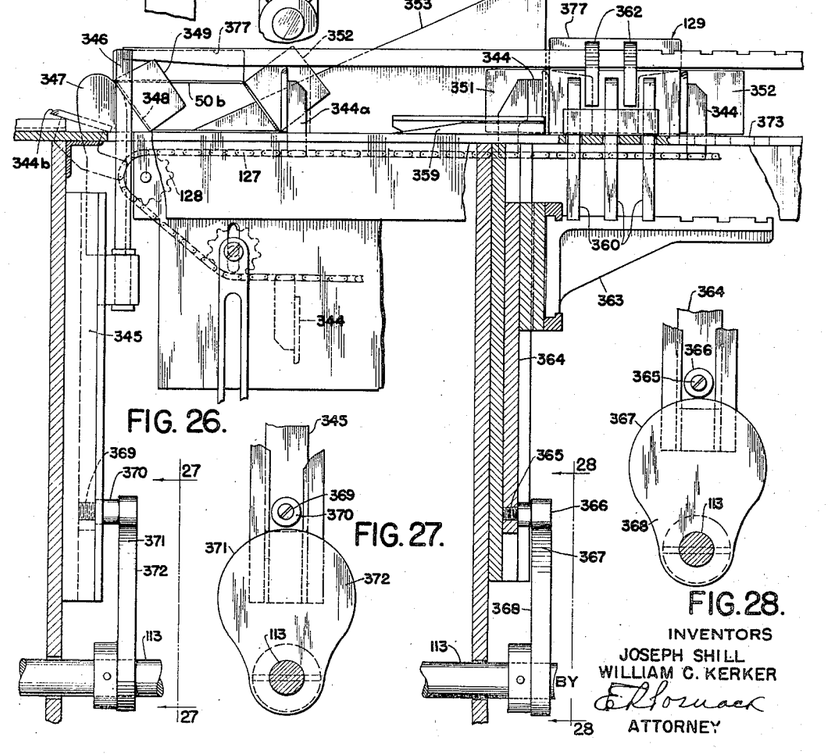
Figure 26 is a fragmentary elevation of Figure 25.
Figure 27 is a fragmentary elevation of Figure 26 looking in the direction of arrows 27—27.
Figure 28 is a fragmentary elevation of Figure 26 looking in the direction of arrows 28—28.

When the roller 342 is brought to its lowermost position, the rack 333 will have been correspondingly moved in the direction of arrow P to slidably move said lowermost collapsed box 50a along table 327, as aforesaid. When the pusher 328 is in its foremost position, (shown dot-dash in Figure 2), the collapsed box 50a will be disposed over the conveyor 127, the operative movement of the conveyor carrying the box with it. Secured to and carried by said conveyor 127 are a plurality of spaced holding blocks 344, these being adapted to hold therebetween a box when it is in its operatively opened position. The pusher member 328 is so timed in its operation that it will bring a box 50b with its leading edge adjacent one of said holding blocks, such as 344a (Figure 26). Thereafter a slide 345 is operatively moved upwardly to lift side bar 346 and two paddles 347 to a box-engaging position, as illustrated in Figures 25 and 26. The paddles 347, with rounded tops, engage the lateral wall 348 of the box, to lift said wall and partially open the box, to the position illustrated in Figure 26; and at the same time the said bar 346 engages the top flap 349 to close it. At this point, the other top flap 350 is in a forwardly extended position, and the bottom flap 351 is in an opposite extended position, the other flaps being in positions to be acted upon by other flap engaging elements, as will hereinafter appear.

As the conveyor moves towards the discharge point, the holding block 344b reaches the upper conveyor level, so that the box is flanked by both said holding blocks 344a and 344b. As the movement continues, bottom flaps 352 and 351, respectively, come into engagement with the sloping wall 353 (Figure 25) which successively opens said flaps 352 and 351—after which these flaps enter the space 354. In the meantime, top flap 350 is engaged by wall 355 which bends it into its closed position. When the box reaches the position in region 356, the outer or end section 357 of the front flap 358 is engaged by wall 359, to partially bend it upwardly, substantially to the dot-dash position thereof in Figure 17. This last-mentioned figure illustrates the position of the box in front of the pusher member 311. At this point the conveyor belt 127 is stationary, its travel having been discontinued by the method hereinabove described; and it is here that the top flap 358 is closed and section 357 thereof tucked in. Three spaced flap closing bars 360 are moved upwardly, by means to be hereinafter described, to engage the underside of flap 358. This causes said flap 358 to swing upwardly in an arcuate direction, the section 357 thereof engaging the undersides 361 of the stationary flap guides 362, said undersides being curved so as to guide the flap 357 towards the box, as illustrated in Figure 17. The drawings show three bars 360 in spaced relation, and two guides 362 disposed therebetween the bars 360 with said guides 362 during the upward movement of the bars to cause the closing and tucking-in operation of the top flap above-mentioned. The floor plate 373 contains therein a plurality of slots 374 which are positioned and proportioned to receive therethrough the said bars 360. It should be noted that while the box is in its loading position, the front flaps 349 and 350 are maintained in closed position by bar 388 (Figures 17 and 25).

Said bars 360 are supported upon a base 363 which is mounted upon a slide 364, the lower portion of which is carried by pin 365 which supports the roller 366 riding upon the outer surface 367 of cam 368. The cam surface is so designed as to cause a vertical reciprocating movement of slide 364 and thereby cause corresponding movements of the base 363 and the flap closing bars 360. The timing of cam 368, which is mounted on cam shaft 113, is synchronized with the movement of conveyor 127 so that the upward movement of slide 364 will occur when the open box is disposed in front of the pusher, as aforesaid.

It should be noted that the above-mentioned slide 345 which causes a lifting of flap-engaging members 346 and 347 is similarly actuated. Slide 345 is attached to pin 369 which carries the roller 370 that rides over the cam surface 371 of cam 372, also fixedly mounted on cam shaft 113.

Figures 29, 30, 31, 32:
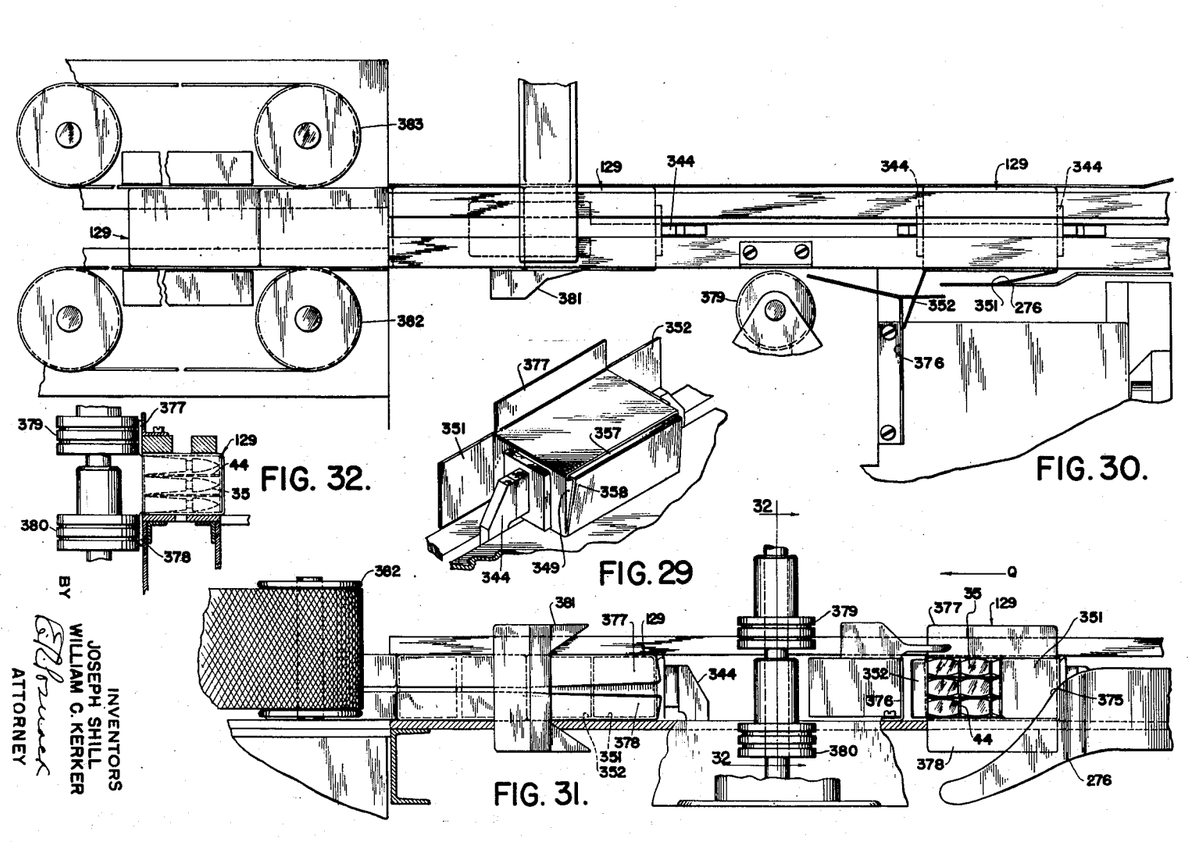
Figure 29 is a perspective view of an open carton operatively engaged by a holder member, in a position to receive the units to be packaged.
Figure 30 is an enlarged plan view of a portion of Figure 1 at the discharge side of the apparatus, in the region of the glueing apparatus.
Figure 31 is a fragmentary elevational view of Figure 30, with parts removed for clarity.
Figure 32 is a section of Figure 31 taken substantially along line 32—32.
Figure 33:
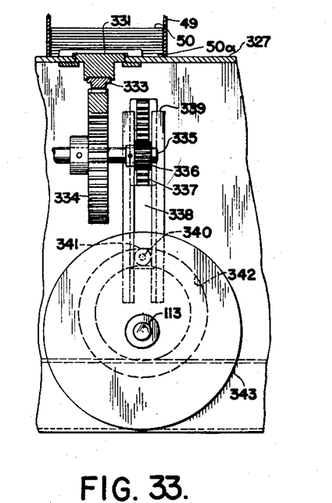
Figure 33 is a fragmentary section of Figure 2 taken along line 33—33 showing the carton pusher mechanism.
Figure 34:
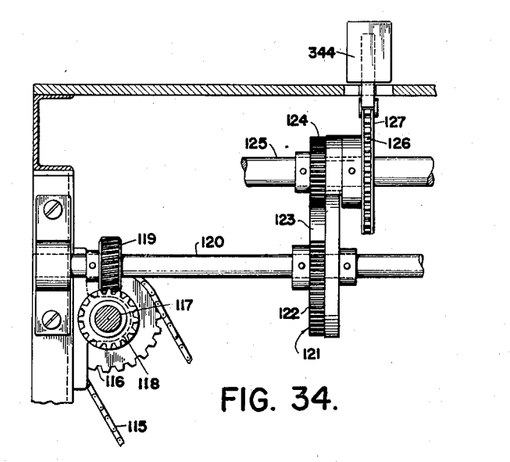
Figure 34 is a fragmentary section of Figure 2 taken along line 34—34 showing the intermittent carton conveyor drive.

Figures 29, 30 and 31 show the discharge and glueing end of the apparatus. As the filled carton 129 is conveyed in the direction of arrow Q, the bottom flap 351 comes into engagement with the bar 276 (of the upwardly moving lowering device 48), the inclined edge 375 thereof engaging said flap and closing it, as illustrated. The opposite bottom flap 352 is engaged by member 376 to close it during the continued movement of the conveyor belt. It will be noted that the other bottom flaps 377 and 378 are still in an open position. These last-mentioned flaps pass underneath the glue rollers 379 and 380 to receive thereon deposits of glue, after which the flaps 377 and 378 are operatively closed by the flap closing device 381. The fully closed and packed box 129 is then carried between the rollers 382 and 383 which are in pressing engagement with the top and bottom flaps, until a point of discharge therebeyond. Glue is applied to rollers 379 and 380 in a manner well known in the art, and such apparatus is accordingly not disclosed herein.

According to the method and apparatus above-described, a series of packaging operations are performed and coordinated. Such operations include the feeding of an uninterrupted line of units to be packaged to a separator partition receiving station, where a series of bottles are deposited upon a waiting partition member which was previously formed from flat stock. The apparatus and method not only sequentially superpose series of such units upon intermittently fed partition members, but also effect a movement of successive series of partition members and superposed units towards a lowering platform and in front of pushing means. Said platform and pushing means are synchronized to effect a transfer of one or more stacks of units and their separator partitions into a waiting carton, said carton having been opened from a previously collapsed condition, and conveyed to a loading point in timed relation to the movement of the stack of units and partitions, whereafter the cartons are effectively loaded, thereafter to be sealed and closed. The entire operation is performed automatically. And the apparatus is adjustable for conveying and packaging of units of different sizes and in different quantities.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

We claim:

1. In a method of making a package comprising a carton and a plurality of partition-separated packaged units, the steps of positioning a selected partition at a predetermined die-cutting station, cutting flap sections in said partition, moving said partition to a predetermined partition receiving station, bending said flap sections upwardly to form flap walls, conveying a selected group of said units to said receiving station, superposing said units upon said partition between certain of said flap walls, conveying said partition and the superposed units to a predetermined carton loading station, positioning a selected open carton in front of said carton loading station and pushing said partition and the superposed units into said carton.

2. In a method of making a package comprising a carton and a plurality of partition-separated packaged units, the steps of positioning a selected partition at a predetermined die-cutting station, cutting flap sections in said partition, moving said partition to a predetermined partition receiving station, bending said flap sections upwardly to form flap walls, engaging the trailing edges of said flap walls and the rear portions of said units and pushing said partition and the superposed units to a predetermined carton loading station, positioning a selected open carton in front of said carton loading station and pushing said partition and the superposed units into said carton.

3. In an apparatus for making a package comprising a carton and a plurality of partition-separated packaged units, the combination of conveyor means for said units along a predetermined feed line, a transfer station on said feed line, a carton conveyor, a carton loading platform at a predetermined loading station adjacent said carton conveyor, partition-feeding means along a predetermined partition feed path, a partition-receiving floor at the end of said path and intermediate said transfer station and said carton loading platform, transfer means movable across said partition-receiving floor and extending from said transfer station to said platform, and pusher means movable between a retracted position behind said platform and a projected position adjacent said carton conveyor, an intermittent drive shaft operatively connected to said partition feeding means, said carton conveyor and said transfer means, a clutch detachably connected to said intermittent drive shaft, electro-mechanical clutch actuating means, a plurality of switches operatively connected in series with said electro-mechanical means, and a plurality of adjacent buttons attached to said switches and interposed along said unit feed line and engageable by the units operatively moving along said feed line, whereby the circuit through said electro-mechanical means is closed only when all said switches are operatively closed.

4. In an apparatus for making a package comprising a carton and a plurality of partition-separated packaged units, the combination of conveyor means for said units along a predetermined feed line, a transfer station on said feed line, a carton conveyor, carton holding means on said carton conveyor, a carton loading platform at a predetermined loading station adjacent said carton conveyor, an intermittent drive for said carton conveyor whereby it is alternately in motion and stationary during predetermined periods, said carton holding means being disposed in front of said loading platform during said stationary periods, partition-feeding means along a predetermined partition feed path, a partition-receiving floor at the end of said path and intermediate said transfer station and said carton loading platform, transfer means movable across said partition-receiving floor and extending from said transfer station to said platform, pusher means movable between a retracted position behind said platform and a projected position adjacent said carton conveyor, and pusher actuating means for operatively moving the pusher into its said projected position during said stationary periods, and die means along said partition feed path for forming flap sections in partitions operatively disposed on said partition feed path, and intermittent drive means operatively connected to said partition feeding means and said die means.

5. In an apparatus for making a package comprising a carton and a plurality of partition-separated packaged units, the combination of conveyor means for said units along a predetermined feed line, a transfer station on said feed line, a carton conveyor, carton holding means on said carton conveyor, a carton loading platform at a predetermined loading station adjacent said carton conveyor, an intermittent drive for said carton conveyor whereby it is alternately in motion and stationary during predetermined periods, said carton holding means being disposed in front of said loading platform during said stationary periods, partition-feeding means along a predetermined partition feed path, a partition-receiving floor at the end of said path and intermediate said transfer station and said carton loading platform, transfer means movable across said partition-receiving floor and extending from said transfer station to said platform, pusher means movable between a retracted position behind said platform and a projected position adjacent said carton conveyor, and pusher actuating means for operatively moving the pusher into its said projected position during said stationary periods, and die means along said partition feed path for forming flap sections in partitions operatively disposed on said partition feed path, and intermittent drive means operatively connected to said partition feeding means and said die means, said die means having a severing element with a straight cutting edge extending transversely across said partition feed path and at an inclination thereto and extending forwardly and away from the direction of said path.

6. In an apparatus for making a package comprising a carton and a plurality of partition-separated packaged units, the combination of conveyor means for said units along a predetermined feed line, a transfer station on said feed line, a carton conveyor, a carton loading platform at a predetermined loading station adjacent said carton conveyor, partition-feeding means along a predetermined partition feed path, a partition-receiving floor at the end of said path and intermediate said transfer station and said carton loading platform, transfer means movable in intersecting relation to said conveyor means and across said floor and extending from said transfer station to said platform, and front pusher means movable between a retracted position behind said platform and a projected position adjacent said carton conveyor, said transfer means having a rest device in front of said transfer station, a rear pusher movable between a projected forward position adjacent said rest device and a retracted position behind said transfer station of said feed line, said rear pusher being operatively movable transversely over said conveyor means, whereby upon an operative forward movement thereof it will push units on said conveyor means upon said rest device, means to reciprocatingly actuate said rear pusher, and intermediate pusher means at said rest device for operative pushing engagement with units supported thereby, said intermediate pusher means being movable across said floor to said platform, for transferring units from said rest device to said platform.

7. In an apparatus for making a package comprising a carton and a plurality of partition-separated packaged units, the combination of conveyor means for said units along a predetermined feed line, a transfer station on said feed line, a carton conveyor, a carton loading platform at a predetermined loading station adjacent said carton conveyor, partition-feeding means along a predetermined partition feed path, a partition-receiving floor at the end of said path and disposed at a level above that of said transfer station, said floor being intermediate said transfer station and said carton loading platform, transfer means movable in intersecting relation to said conveyor means and across said floor and extending from said transfer station to said platform, and front pusher means movable between a retracted position behind said platform and a projected position adjacent said carton conveyor, said transfer means having a rest device in front of said transfer station, a curved wall extending upwardly from said rest device and rearwardly to an upper flat portion at the level of said floor, a rear pusher at said transfer station operatively movable transversely over said conveyor means for pushing conveyed units upon said rest device, said rest device being movable upwardly and rearwardly along said curved wall to the said upper flat portion thereof, for operatively transferring units to said flat portion, and a bar movable forwardly between said flat portion and said loading platform, said bar being positioned to engage units operatively disposed on said flat portion and push them across said floor to said loading platform.

8. In an apparatus for making a package comprising a carton and a plurality of partition-separated packaged units, the combination according to claim 7, said curved wall having a slotted portion extending upwardly and rearwardly therealong, an arm extending through and movable along said slotted portion, said arm carrying said rest device, and means to reciprocatingly actuate said arm along said slotted portion.

9. In an apparatus for making a package comprising a carton and a plurality of partition-separated packaged units, the combination according to claim 7, said bar being carried by sprocket chain means disposed above said flat portion and said floor.

10. In an apparatus for making a package comprising a carton and a plurality of partition-separated packaged units, the combination according to claim 4, and intermittently actuated upsetting ears movable upwardly through said floor and positioned to upset said flap sections in said partitions.

11. In an apparatus for making a package comprising a carton and a plurality of partition-separated packaged units, the combination of conveyor means for said units along a predetermined feed line, a transfer station on said feed line, a carton conveyor, a carton loading platform at a predetermined loading station adjacent said carton conveyor, said platform having a plurality of spaced parallel grids, partition-feeding means along a predetermined partition feed path, a partition-receiving floor at the end of said path and intermediate said transfer station and said carton loading platform, transfer means movable across said partition-receiving floor and extending from said transfer station to said platform, and pusher means having a plurality of spaced parallel grids disposed between the said grids of said platform, said pusher means movable between a retracted position behind said platform and a projected position adjacent said carton conveyor.

12. In an apparatus for making a package comprising a carton and a plurality of partition-separated packaged units, the combination of conveyor means for said units along a predetermined feed line, a transfer station on said feed line, a carton conveyor, a carton loading platform at a predetermined loading station adjacent said carton conveyor, partition-feeding means along a predetermined partition feed path, a partition-receiving floor at the end of said path and intermediate said transfer station and said carton loading platform, transfer means movable across said partition-receiving floor and extending from said transfer station to said platform, and pusher means movable between a retracted position behind said platform and a projected position adjacent said carton conveyor, said carton conveyor being at a level below that of said partition-receiving floor, said loading platform being movable between the level of said floor to that of said carton conveyor, said pusher being disposed at said lower level, said platform having thereon a cam follower, and a cam device having an inclined cam surface operatively supporting said follower, said cam device being movable relative to said platform, whereby the level of said follower and of the platform is varied.

13. In an apparatus for making a package comprising a carton and a plurality of partition-separated packaged units, the combination according to claim 12, and means to change the inclination of said cam surface.

14. In an apparatus for making a package comprising a carton and a plurality of partition-separated packaged units, the combination of conveyor means for said units along a predetermined feed line, a transfer station on said feed line, a carton conveyor, carton holding means on said carton conveyor, a carton loading platform at a predetermined loading station adjacent said carton conveyor, an intermittent drive for said carton conveyor whereby it is alternately in motion and stationary during predetermined periods, said carton holding means being disposed in front of said loading platform during said stationary periods, partition-feeding means along a predetermined partition feed path, a partition-receiving floor at the end of said path and intermediate said transfer station and said carton loading platform, transfer means movable across said partition-receiving floor and extending from said transfer station to said platform, pusher means movable between a retracted position behind said platform and a projected position adjacent said carton conveyor, pusher actuating means for operatively moving the pusher into its said projected position during said stationary periods, a plurality of spaced vertically movable flap closing bars adjacent the front of the carton conveyor at the region of said loading platform, and means to actuate said bars upwardly during said stationary periods, and a plurality of stationary flap deflecting bars between said movable bars and having arched upper portions extending to the predetermined level of the conveyed cartons, said arched portions being positioned to engage flaps operatively engaged by said flap closing bars.

References Cited in the file of this patent
UNITED STATES PATENTS

| Number | Name | Date |
|---|---|---|
| 1,208,802 | Lienau | Dec. 19, 1916 |
| 1,417,591 | Anderson | May 30, 1922 |
| 1,592,426 | Hilder | July 13, 1926 |
| 1,851,457 | Smith | Mar. 29, 1932 |
| 1,874,669 | Wagner | Aug. 30, 1932 |
| 2,254,097 | Wood | Aug. 26, 1941 |
| 2,291,645 | Nordquist | Aug. 4, 1942 |
| 2,351,596 | Brogden | June 20, 1944 |
| 2,556,188 | Jakob | June 12, 1951 |
| 2,608,038 | Knowlton | Aug. 26, 1952 |
| 2,615,289 | Hickin | Oct. 28, 1952 |
| 2,651,896 | Woodruff | Sept. 15, 1953 |